(12) United States Patent  
Oguro

(10) Patent No.: US 6,703,826 B2
(45) Date of Patent: Mar. 9, 2004

(54) ROTATION DETECTOR HAVING IMPROVED VIBRATION CHARACTERISTICS

(75) Inventor: Yuji Oguro, Niigata (JP)

(73) Assignee: Nippon Seiki Co., Ltd., Niigata (JP)

( * ) Notice: Subject to any disclaimer, the term of this patent is extended or adjusted under 35 U.S.C. 154(b) by 7 days.

(21) Appl. No.: 10/181,772
(22) PCT Filed: Nov. 19, 2001
(86) PCT No.: PCT/JP01/10104
§ 371 (c)(1),
(2), (4) Date: Jul. 22, 2002
(87) PCT Pub. No.: WO02/42781
PCT Pub. Date: May 30, 2002

(65) Prior Publication Data
US 2002/0190711 A1 Dec. 19, 2002

(30) Foreign Application Priority Data

Nov. 22, 2000 (JP) ......................... 2000-355245
Nov. 30, 2000 (JP) ......................... 2000-364420
Nov. 30, 2000 (JP) ......................... 2000-369596

(51) Int. Cl.$^7$ ................. G01P 3/48; G01P 3/54
(52) U.S. Cl. ................... 324/174; 324/207.25
(58) Field of Search ............... 324/207.22, 207.2, 324/207.25, 166, 173, 175, 174; 73/514–39; 180/170; 188/181 R; 303/138

(56) References Cited

U.S. PATENT DOCUMENTS 3,915,266 A * 10/1975 Lantz ................. 188/181 R
5,127,747 A * 7/1992 Hilby et al. ............. 384/448
5,880,585 A * 3/1999 Oguto ................. 324/174

FOREIGN PATENT DOCUMENTS

| EP | 0 793 101 A1 | 9/1997 |
| JP | 60-84386 | 6/1985 |
| JP | 62-37772 | 3/1987 |
| JP | 2-264817 | 10/1990 |
| JP | 9-229714 | 9/1997 |
| JP | 2000-249715 | 9/2000 |

* cited by examiner

Primary Examiner—N. Le
Assistant Examiner—Subhash Zaveri
(74) Attorney, Agent, or Firm—McDermott, Will & Emery

(57) ABSTRACT

Even when a cheap magnetic responsive element is used for a magnetic detecting portion, a rotation detector excellent in vibration resistance is provided, a housing 1 being provided with a tubular insertion portion 1a through which an axle 13 is inserted. A rotor 5 is provided with a cylindrical portion 5a through which the insertion portion 1a is inserted and that has a plurality of magnetic poles and rotates synchronously with a front wheel (wheel) 11 fitted to the axle 13. The magnetic detecting portion (rotation detecting portion) 3 detects a change of magnetic poles accompanying the rotation of the cylindrical portion 5a. A spacer (magnetic member) 4 is disposed in the surroundings of the insertion portion 1a of a bottom portion 1g of the housing 1, and holds the rotor 5 at the bottom portion 1g when the cylindrical portion 5a is fitted into the insertion portion 1a.

8 Claims, 7 Drawing Sheets

ROTATION DETECTOR HAVING IMPROVED VIBRATION CHARACTERISTICS

TECHNICAL FIELD

The present invention relates to a rotation detector that is attached to a hub of a front wheel of a two-wheeled vehicle, such as a motorcycle, a bicycle and so on, and transmits the rotation number of a wheel of the two-wheeled vehicle to a indicator such as a speed meter and so on.

BACKGROUND ART

As an existing electric rotation detector, there is one such as disclosed in Japanese Patent Laid-Open No. 264817/1990. When such the rotation detector is used as a rotation detector for use in a two-wheeled vehicle (for instance, a motorcycle), the rotation detector is formed by disposing a magnetic detecting element (Hall IC) and a magnet, both of which are mounted on a circuit board, to a substantially cylindrical resin case having a detection surface for detecting a detecting object so as to follow the detection surface, and followed by sealing the circuit board, the magnetic converting element and the magnet with a sealing member made of an epoxy resin and so on. It is general for the rotation detector to be attached to a mission case or a sprocket cover and to detect, as a detecting object, a mission gear, a tooth point of the sprocket or the like revolving therein.

When a tooth point of a mission gear or sprocket or the like is detected with such the rotation detector as a detecting object, since there is a little clearance in the detecting object, the object is caused to vibrate owing to a body stiffness, an engine displacement or the like of a vehicle (two-wheeled vehicle), and a detection position gap between the detecting object and the rotation detector may result in fluctuating. This generates a magnetic fluctuation in the rotation detector and resultantly becomes detection noise. Accordingly, there is a problem in that an indicator for displaying, for instance, a speed corresponding to an output data that is output from the rotation detector may wrongly operate.

The present inventors paid attention to the above problem and have proposed, as shown in Japanese Patent Laid-Open No. 229714/1997, an electric rotation detector that can be attached to a hub of a front wheel of a two-wheeled vehicle. The rotation detector is provided to a resin housing with an insertion portion through which an axle (front axle) of a two-wheeled vehicle is inserted, is equipped to the insertion portion with a rotor having a plurality of magnetic poles that rotates synchronously with a wheel fitted to the axle, and detects the rotation of the rotor by means of a magnetic detecting portion that is accommodated in the housing and made of such as Hall IC or the like. The rotation detector, without incurring an adverse influence of the detection noise due to the vibration of the detecting object, allows accurately detecting the rotation.

In recent years, demands for the cost reduction of the rotation detectors that are applied to the two-wheeled vehicles are increasing. Accordingly, there is a tendency in which the rotation detecting portions are switched from the magnetic detecting elements such as Hall ICs and so on to cheaper magnetic responsive elements such as reed switches or the like. However, there is a problem in the magnetic detecting means using the magnetic responsive element in that from it characteristics and structure, in comparison with the magnetic detecting portion that uses the Hall IC or the like, vibration resistance is low.

The invention is carried out by paying attention to the aforementioned problem and intends to provide a rotation detector that is excellent in the vibration resistance even when the cheaper magnetic responsive element is used in the magnetic detecting portion.

DISCLOSURE OF THE INVENTION

In the invention, in order to overcome the aforementioned problem, a rotation detector comprises a housing provided with a tubular insertion portion through which an axle is inserted; a rotor that is provided with a cylindrical portion through which the insertion portion is inserted and has a plurality of magnetic poles, and rotates synchronously with a wheel that is fitted to the axle; a rotation detecting portion for detecting a change of the magnetic poles accompanying the rotation of the cylindrical portion; and a magnetic member that is disposed in the surroundings of the insertion portion of a bottom of the housing and can hold the rotor to the bottom when the cylindrical portion is fitted into the insertion portion.

In addition, the magnetic member is formed of a plane table member disposed so as to surround the insertion portion in the bottom portion of the housing.

Furthermore, the magnetic member is formed integrally with the insertion portion.

Still furthermore, a rotation detector comprises a housing one end of which abuts against an inner wheel of a bearing that is disposed to a hub of a wheel, and which is provided with a tubular insertion portion through which an axle that penetrates through the bearing is inserted; a rotor that is provided with a cylindrical portion, through which the insertion portion is inserted, and a rotation transmitter for rotating the cylindrical portion synchronously with the rotation of the wheel; a rotation detecting portion that is disposed in the housing and detects the rotation of the rotor; and a convexity that is disposed at a position that faces the inner wheel in the bearing of the rotor and capable of abutting against the inner wheel.

Furthermore, the convexities are partially disposed at positions that face the inner wheel and along a periphery of an opening through which the insertion portion is inserted.

Furthermore, a rotation detector comprises a housing one end of which abuts against a bearing that is disposed to a hub of a wheel, and which is provided with a tubular insertion portion through which an axle that penetrates through the bearing is inserted; a rotor that is provided with a cylindrical portion, through which the insertion portion is inserted, and a rotation transmitter for transmitting the rotation of the wheel to the cylindrical portion by abutting against a rotation-biasing portion disposed to the hub; a rotation detecting portion that is disposed in the housing and detects the rotation of the rotor; and a contact portion that is disposed in a portion that abuts against the rotation-biasing portion of the rotation transmitter and maintains a contact area between both members smaller.

Furthermore, the contact portion is provided with a projection that comes into contact with a flat surface of the rotation-biasing portion.

Still furthermore, the contact portion is made of a flat surface that comes into contact with the projection disposed to the rotation-biasing portion.

BEST MODE FOR CARRYING OUT THE INVENTION

Figure 1:
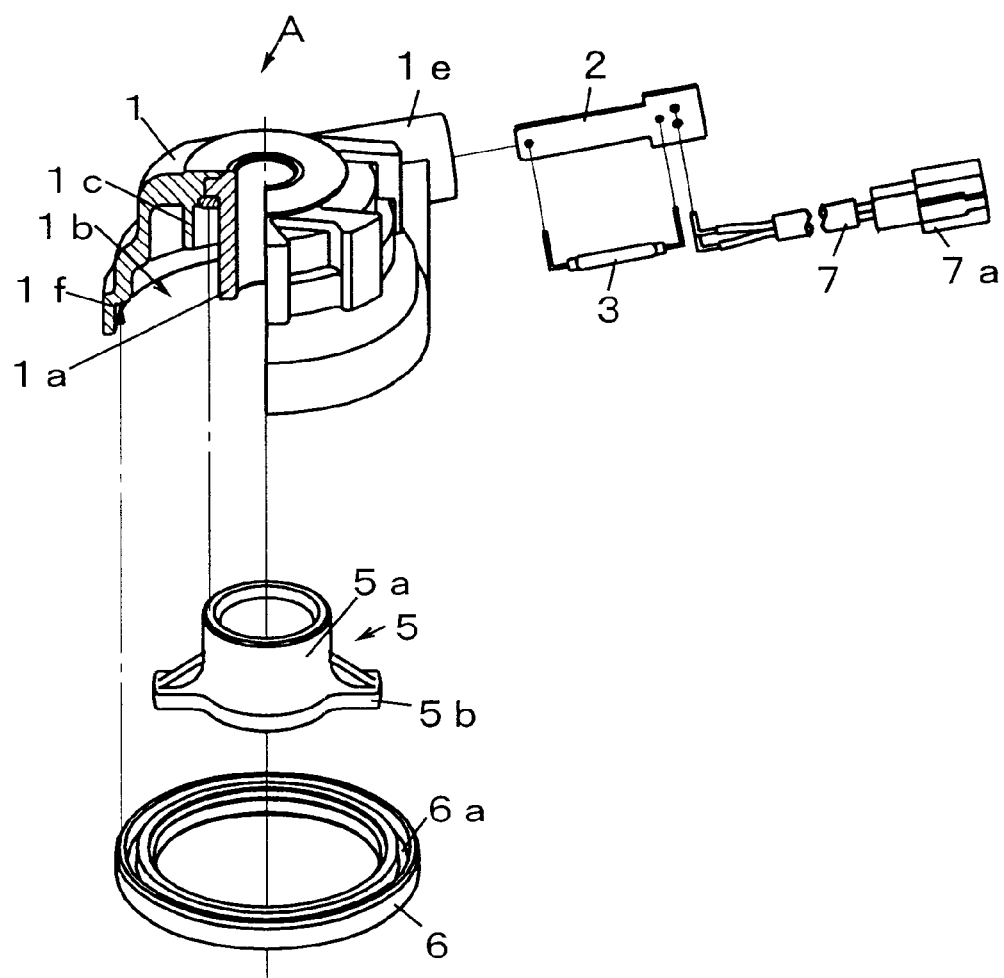
FIG. 1 is an exploded perspective view of a first embodiment of the invention.
Figure 2:
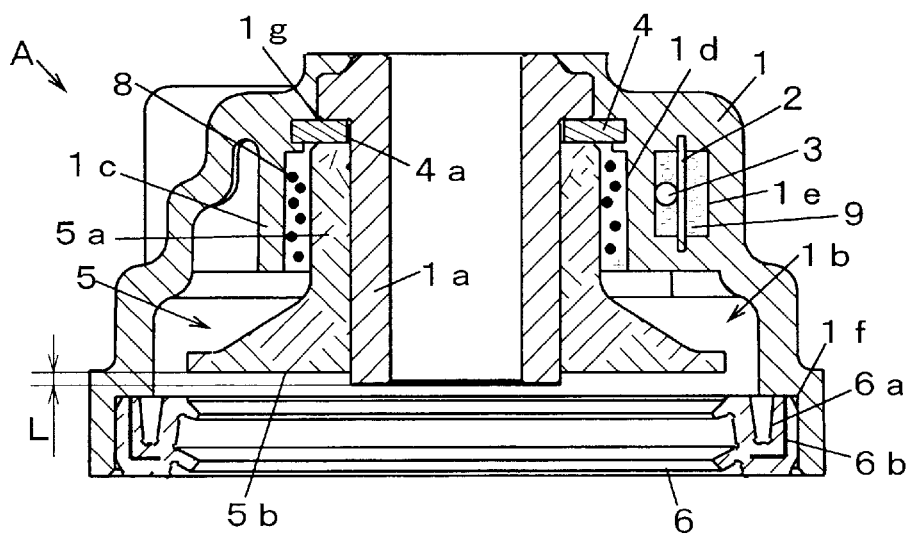
FIG. 2 is a substantial sectional view of the first embodiment.
Figure 3:
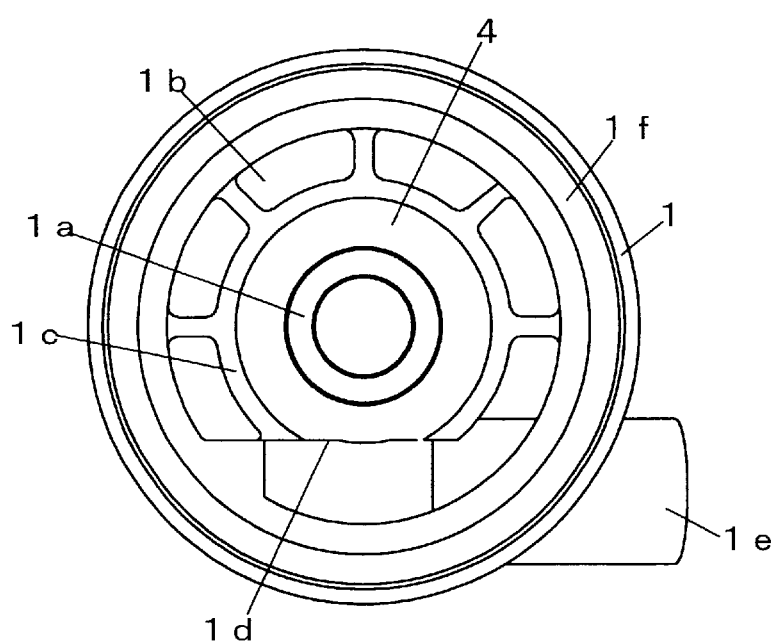
FIG. 3 is a plan view of a housing of the first embodiment.

In the following, a first embodiment of the invention will be explained with reference to the accompanying drawings. In FIGS. 1 through 3, a rotation detector A is constituted of a housing 1, a circuit board 2, a magnetic detecting portion (rotation detecting portion) 3, a spacer (magnetic member) 4, a rotor 5, a sealing member 6 and a wiring cord 7.

The housing 1 is made of a resin material such as polybutylene terephthalate, nylon or the like. In a substantial center of the housing 1, a cylindrical insertion portion 1a that is made of a metal and through which an axle, which will be explained later, is inserted is insertion molded, and outside of the insertion portion 1a an accommodating space 1b for disposing a rotor 5, which will be explained later, rotatably with respect to an outer periphery of the insertion portion 1a. Furthermore, along a periphery of a place where the rotor 5, which will be explained later, is disposed to the insertion portion 1a in the accommodating space 1b, a wall portion 1c is formed surrounding the rotor 5, and between the wall portion 1c and the rotor 5 fitted into the insertion portion 1a a lubricant 8 made of grease or the like is coated. In addition, at a predetermined place of the wall portion 1c, a rotation detecting surface 1d is disposed in close vicinity to the cylindrical portion of the rotor 5.

Furthermore, in the housing 1, an accommodating portion 1e is formed. The accommodating portion 1e accommodates a circuit board 2, which will be explained later, and the magnetic detecting portion 3 that is a rotation detecting portion, and has a not shown guide groove that guides and supports the circuit board 2. When the circuit board 2 is guided along the guide groove of the accommodating portion 1e and accommodated therein, the magnetic detecting portion 3 is disposed so as to face the rotation detecting surface 1d. Still furthermore, at an opening end of the housing 1 (lower side of the housing 1 in FIG. 2), a susceptor 1f for pressure inserting and holding a sealing member 6 that will be explained later is formed.

The circuit board 2 is made of an insulating material such as paper phenol, glass epoxy or the like, and provided with a not shown wiring pattern thereon. A not shown land portion formed at a predetermined place of the wiring pattern, the magnetic detecting portion 3 and the wiring cord 7 are electrically fixed by use of a solder. After the magnetic detecting portion 3 is disposed in the accommodating portion 1e so as to correspond to a position of the rotation detecting surface 1d that is formed in the housing 1, thus formed circuit board 2 is fixed in the accommodating portion 1e by filling the sealing member 9 made of such as epoxy or the like in the accommodating portion 1e.

The magnetic detecting portion 3 is made of a magnetic responsive element such as a reed switch or the like that detects a change of magnetic poles.

The spacer 4 is provided with an opening 4a through which the insertion portion 1a of the housing 1 is inserted and made of a magnetic member made of metals such as SK, SUM, and SS. The spacer 4 is an annular plane table member in this first embodiment, insertion molded at a bottom portion 1g of the housing 1, and disposed so as to surround the insertion portion 1a at the bottom portion 1g.

The rotor 5 is provided with a cylindrical portion 5a that is fitted in the insertion portion 1a of the housing 1 and capable of rotating with respect to an outer periphery of the insertion portion 1a, and a rotation transmitter 5b that matches a locking claw that is a rotation biasing portion of a hub of a front wheel that will be explained later and transmits the rotation of the front wheel to the cylindrical portion 5a. The cylindrical portion 5a and the rotation transmitter 5b are integrally formed with a plastic magnet made of an anisotropic or isotropic material. For instance, quadrupole magnetizing (800 to 600 gauss) is applied to the cylindrical portion 5a of the rotor 5, and thereby a change of the magnetic poles accompanying the rotation of the cylindrical portion 5a is made detectable by the magnetic detecting portion 3.

Furthermore, the rotor 5 is disposed in the housing 1 so that, when the cylindrical portion 5a is fitted into the insertion portion 1a of the housing 1, the rotation transmitter 5b may be disposed in a state that secures a little distance L from an end portion of the insertion portion 1a.

The sealing member 6 is made of an elastic member such as nitrile, silicone or the like, and is formed into a thin cylinder. In the sealing member 6, a groove portion 6a that is formed into a substantial V-shape in its cross section is formed over an entire circumference, and in a thick portion outward from the groove portion 6a a holding member 6b made of a metal whose cross section is formed into a substantial L-shape is insertion molded. Such the sealing member 6, by forming an outer diameter thereof a little larger than an inner diameter of a peripheral wall in the susceptor portion 1f of the housing 1, can be pressure inserted into the susceptor 1f of the housing 1 and held there.

The wiring cord 7 transmits an output signal from the magnetic detecting portion 3 through the circuit board 2 to the outside, and at an end of the wiring cord 7 a connector portion 7a for connecting with other instrument is disposed.

A rotation detector A is formed of the aforementioned respective portions. Next, with FIG. 4 added to the above, how to attach the rotation detector A to a two-wheeled vehicle will be explained. In the following explanation, coded positions that do not appear in FIG. 4 should be referenced to FIGS. 1 to 3.

Figure 4:
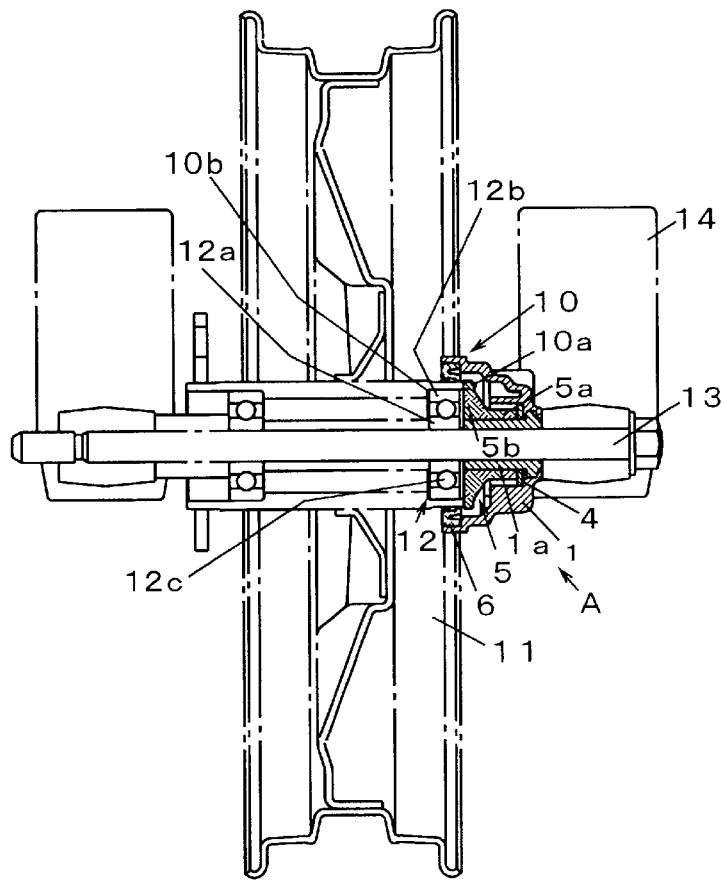
FIG. 4 is a diagram showing an attached state in the first embodiment.

In FIG. 4, reference numeral 10 denotes a hub of a front wheel (wheel) 11 of a motorcycle or the like, reference numeral 10a denotes a locking claw that is a rotation biasing portion for transmitting the rotation of the front wheel 11 to the rotation transmitter 5b of the rotor 5, and reference numeral 12 denotes a bearing that is pressure inserted into a concavity 10b disposed to the hub 10 and provided with an inner wheel 12a and an outer wheel 12b, wherein the outer wheel 12b rotates with respect to the inner wheel 12a with balls 12c therebetween. According to the configuration of the above respective portions, the front wheel 11 is attached to the axle 13 by means of the inner wheel 12a of the bearing 12 and disposed rotatably with respect to the axle 13 by means of the outer wheel 12b.

In the rotation detector A attached to the front wheel 11 configured as mentioned above, the axle 13 is inserted through the insertion portion 1a of the housing 1 and the rotation transmitter 5b disposed to the rotor 5 is engaged with the locking claw 10a formed in the hub 10, and the insertion portion 1a of the housing 1 is filled into the hub 10 so as to abut against the inner wheel 12a of the bearing 12. Thereby, the rotation detector A is fitted between a front fork 14 and the front wheel 11, thereby the rotor 5 is made rotatable accompanying the rotation of the front wheel 11.

Such the rotation detector A is characterized in that the spacer 4 that is a magnetic member is disposed at the bottom 1g of the housing 1. The magnetized cylindrical portion 5a of the rotor 5 is held in close contact with the bottom portion 1g owing to the spacer 4 made of a magnetic material. Accordingly, even when the vibration caused by external factors or the like such as an engine displacement and an engine in an idling state in particular when a vehicle is in a stop state has been transmitted (transmitted through the rotation transmitting portion 5b) to the rotor 5, since the rotor 5 is held in close contact with the spacer 4, the rotor 5 is suppressed from vibrating, resulting in enabling to hinder a wrong detection in magnetic detection.

Furthermore, the rotor 5 held in close contact with the bottom portion 1g of the housing 1 is made possible to maintain a state in which the rotation transmitting portion 5b does not abut against the outer wheel 12b of the bearing 12 that is disposed to the hub 10. This is, because vibration modes transmitted to the rotor 5 are different from each other between the inner wheel 12a and the outer wheel 12b of the bearing 12, of importance in view of hindering the wrong detection by the magnetic detecting portion 5 from occurring.

That is, the outer wheel 12b of the bearing 12 has the vibration mode that is transmitted from tires attached to the front wheel 11 and that is different from that of the rotation detector A attached through the insertion portion 1a to the axle 13. Since two different kinds of vibration modes are not allowed to transmit to the rotor 5, the wrong detection in the magnetic detection may be hindered from occurring.

The wrong detection in the magnetic detection is conspicuously caused when the magnetic detecting portion 3 is made of the reed switch and a magnetized area applied to the cylindrical portion 5a is located at a switching point in the rotation detecting surface 1d of the housing 1. However, since by intervening the spacer 4 made of a magnetic material the rotor 5 may be suppressed from vibrating, even when a cheaper magnetic detecting portion where the reed switch is used is used, a rotation detector A that allows excellently detecting the rotation can be obtained.

Next, a modification mode of the first embodiment will be explained with reference to FIG. 5. For the same or corresponding places as the first embodiment, the same reference numerals are given and their detailed explanations will be omitted.

Figure 5:
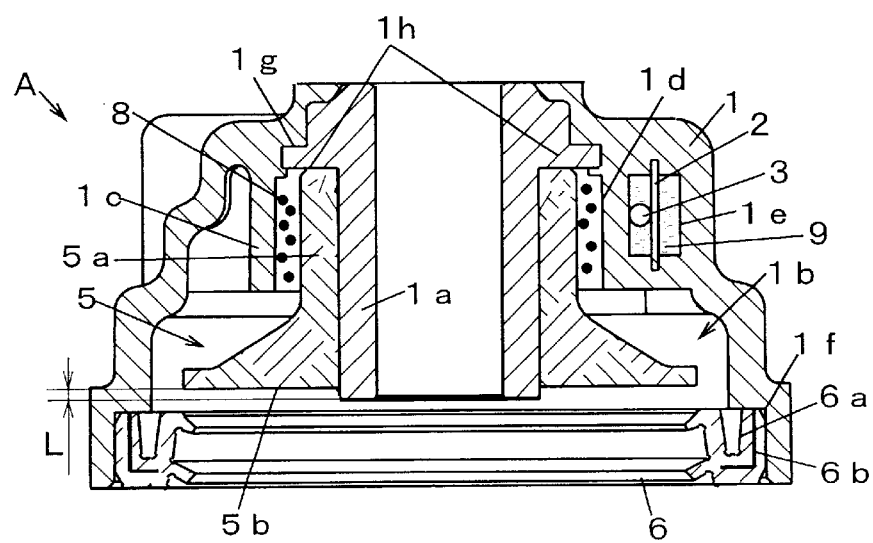
FIG. 5 is a substantial sectional view showing a modification of the first embodiment.

In a rotation detector A shown in FIG. 5, there is a different point from the first embodiment in that without disposing the spacer 4 made of a magnetic material, rotor 5 is held in close contact with the bottom portion 1g of the housing 1.

That is, in the rotation detector A, the insertion portion 1a disposed in the housing 1 is made of the same material as, for instance, the spacer 4 (metals such as SK, SUM and SS), and by disposing an abutting portion (magnetic member) 1h, which abuts against the cylindrical portion 5a of the rotor 5 in the bottom portion 1g of the housing 1, to the insertion portion 1a, similarly to the first embodiment, the cylindrical portion 5a of the rotor 5 is held in close contact with the bottom portion 1g side of the housing 1.

In thus configured rotation detector A, by use of the abutting portion 1h that is integrally disposed with the insertion portion 1a and exposed from the bottom portion 1g of the housing 1, an identical effect as the aforementioned spacer 4 is disposed can be obtained. In addition, by configuring the abutting portion 1h that is a magnetic material so as to be integrated with the insertion portion 1a, a parts count may be decreased, resulting in the cost reduction in manufacturing the rotation detector A.

Furthermore, in the first embodiment, the spacer 4 is disposed to the bottom portion 1g of the housing 1 by means of insertion molding. However, the spacer 4 may be disposed and fixed to the bottom portion 1g of the housing 1 by use of an adhesive or the like.

Figure 6:
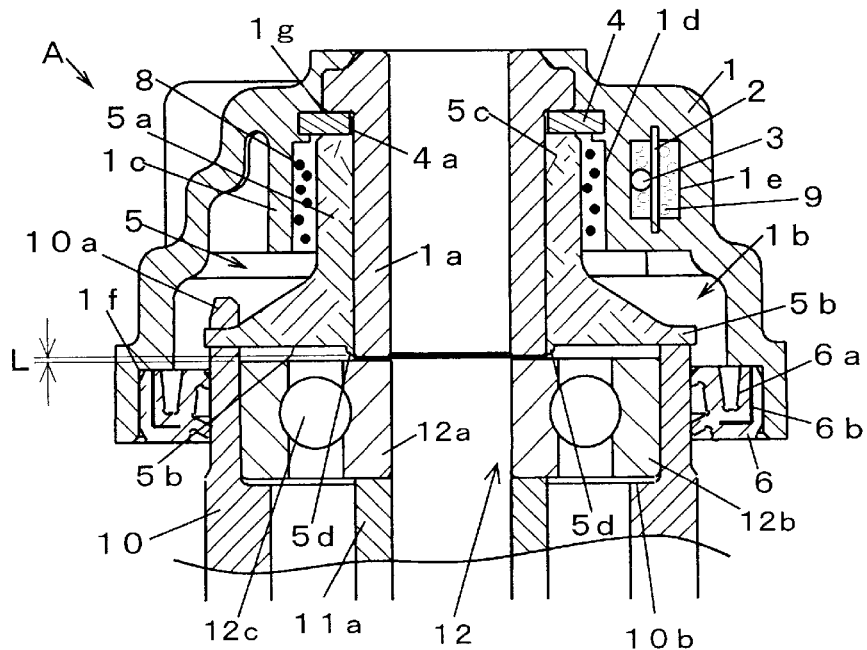
FIG. 6 is a substantial sectional view of a second embodiment.

Next, a second embodiment will be explained with reference to FIGS. 6 and 7. For the same or corresponding places as the first embodiment, the same reference numerals are given and their detailed explanations will be omitted.

The rotor 5 according to the second embodiment is provided with convexities 5d capable of abutting against the inner wheel 12a at positions that face the inner wheel 12a of the bearing 12.

Four convexities 5d are partially disposed at places that face the inner wheel 12a and along a periphery of an opening 5c through which the insertion portion 1a is inserted.

Furthermore, the rotor 5 is disposed in the housing 1 so that when the cylindrical portion 5a is filled into the insertion portion 1a of the housing 1, the convexities 5d may be located at places that secure a little distance L from an end portion of the insertion portion 1a.

Figure 7:
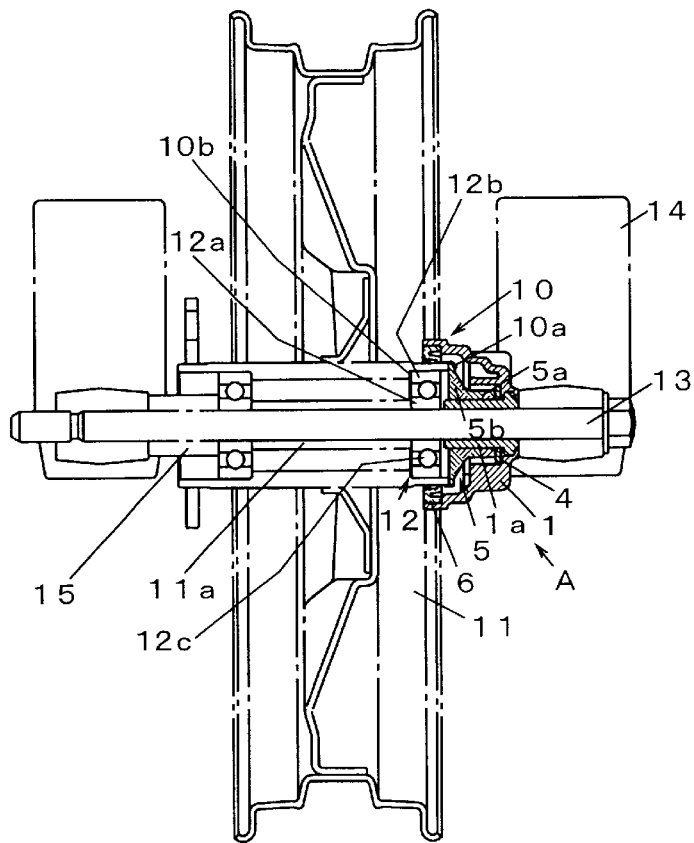
FIG. 7 is a diagram showing an attached state in the second embodiment.

In FIG. 7, the inner wheel 12a of the bearing 12 is fixed in a state where through the axle 13 from right to left in the figure, the housing 1 (insertion portion 1a), the inner wheel 12a, a tubular body 11a inside of the hub 10 of the front wheel 11 and an intermediate tubular body 15 are pinched by the front fork 14. Accordingly, when the housing 1 equipped with the magnetic detecting portion 3 and the inner wheel 12a are caused to vibrate, their vibrations become the same one. By contrast, since the outer wheel 12b of the bearing 12 is fixed to the hub 10 of the front wheel 11, when the front wheel 11 and the outer wheel 12b are caused to vibrate, their vibrations become the same one. Since the inner wheel 12a and the outer wheel 12b are disposed with the ball 12c therebetween, the vibration is not transmitted uniformly. Accordingly, since the vibration mode of the rotation detector A attached through the insertion portion 1a to the axle 13 and one that is transmitted from the tires mounted to the front wheel 11 to the outer wheel 12b of the bearing 12 are different, when the rotor 5 is brought into contact with the outer wheel 12b that is different in the vibration mode from the magnetic detecting portion 3 that is the rotation detecting portion, because of the difference of the vibration mode, the wrong detection may result. Accordingly, when the rotor 5 is brought into contact with the inner wheel 12a that is the same in the vibration mode as the magnetic detecting portion 3, because the vibration modes become the same one, the wrong detection may be hindered from occurring.

Furthermore, even when owing to excessive vibration the close contact of the rotor 5 with the bottom portion 1g of the housing 1 is lost and the rotor 5 moves toward the bearing 12, the rotor 5 can maintain a state in which the rotor 5 abuts against the inner wheel 12a of the bearing 12 through the convexities 5d formed to the rotor 5 and does not abut against the outer wheel 12b. This is important, in view of the vibration modes transmitted to the rotor 5 being different between the inner wheel 12a and the outer wheel 12b of the bearing 12, in hindering the wrong detection due to the magnetic detecting portion 5 from occurring.

The wrong detection in the magnetic detection appears conspicuously when the magnetic detecting portion 3 is made of the reed switch and the magnetizing area applied to the tubular body 5a is located at a switching point in the rotation-detecting surface 1d of the housing 1. However, by intervening the spacer 4 made of the magnetic material, the vibration of the rotor 5 can be suppressed. Furthermore, by disposing the convexities 5d to the rotation transmitting portion 5b, even when the rotor 5 becomes separated from the bottom portion 1g due to the excessive vibration, since the rotor 5 (rotation transmitting portion 5b) is structured not to abut against the outer,wheel 12b, even when the cheap magnetic detecting portion that uses the reed switch is used, a rotation detector A that allows detecting the rotation with excellence can be structured.

Furthermore, in the second embodiment, since the rotor 5 is pulled toward the bottom portion 1g side of the housing 1, the rotor 5 comes rarely into contact with the inner wheel 12a. However, by substituting a corrugated washer for the spacer 4 in the second embodiment, the corrugated washer may be applied to one in which the rotor 5 is pushed toward the bearing 12. In this case also, since the rotor 5 comes into connection with the inner wheel 12a owing to the convexities 5d and can be hindered from vibrating, even when the cheap magnetic detecting portion that uses the reed switch is used, the rotation detector A that allows detecting the rotation with excellence can be structured.

Figure 8:
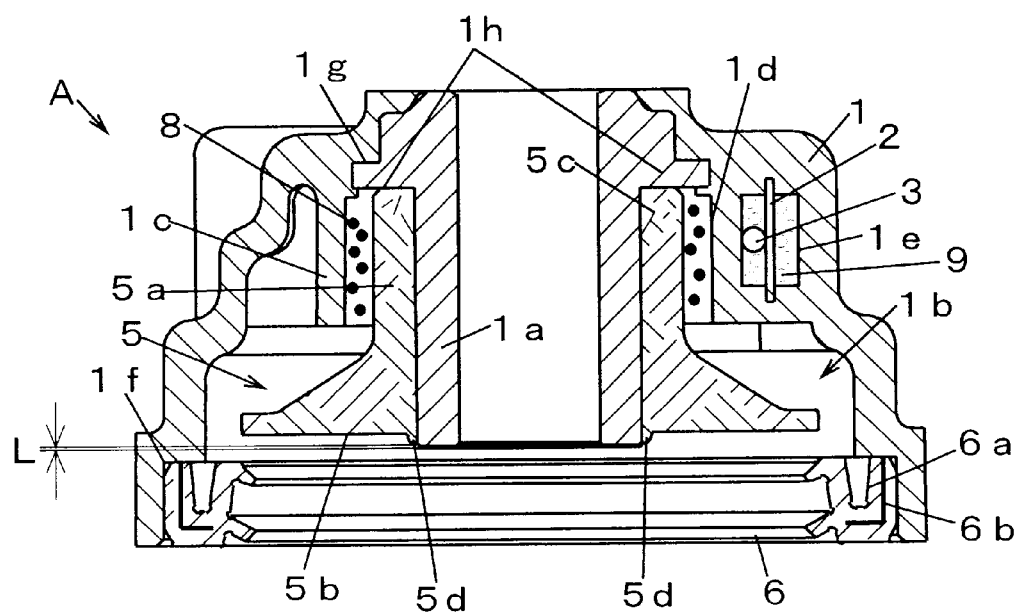
FIG. 8 is a substantial sectional view showing a modification of the second embodiment.

Next, a modification mode of the second embodiment will be explained with reference to FIG. 8. For the same or corresponding places as the second embodiment, the same reference numerals are given and their detailed explanations will be omitted.

The present modification mode is different from the second embodiment in that similarly to the modification mode of the first embodiment, without disposing the spacer 4 that is made of the magnetic material, the rotor 5 is held in close contact with the bottom portion 1g of the housing 1. By constituting like this, the identical operational effect as the modification mode of the first embodiment can be obtained.

Figure 9:
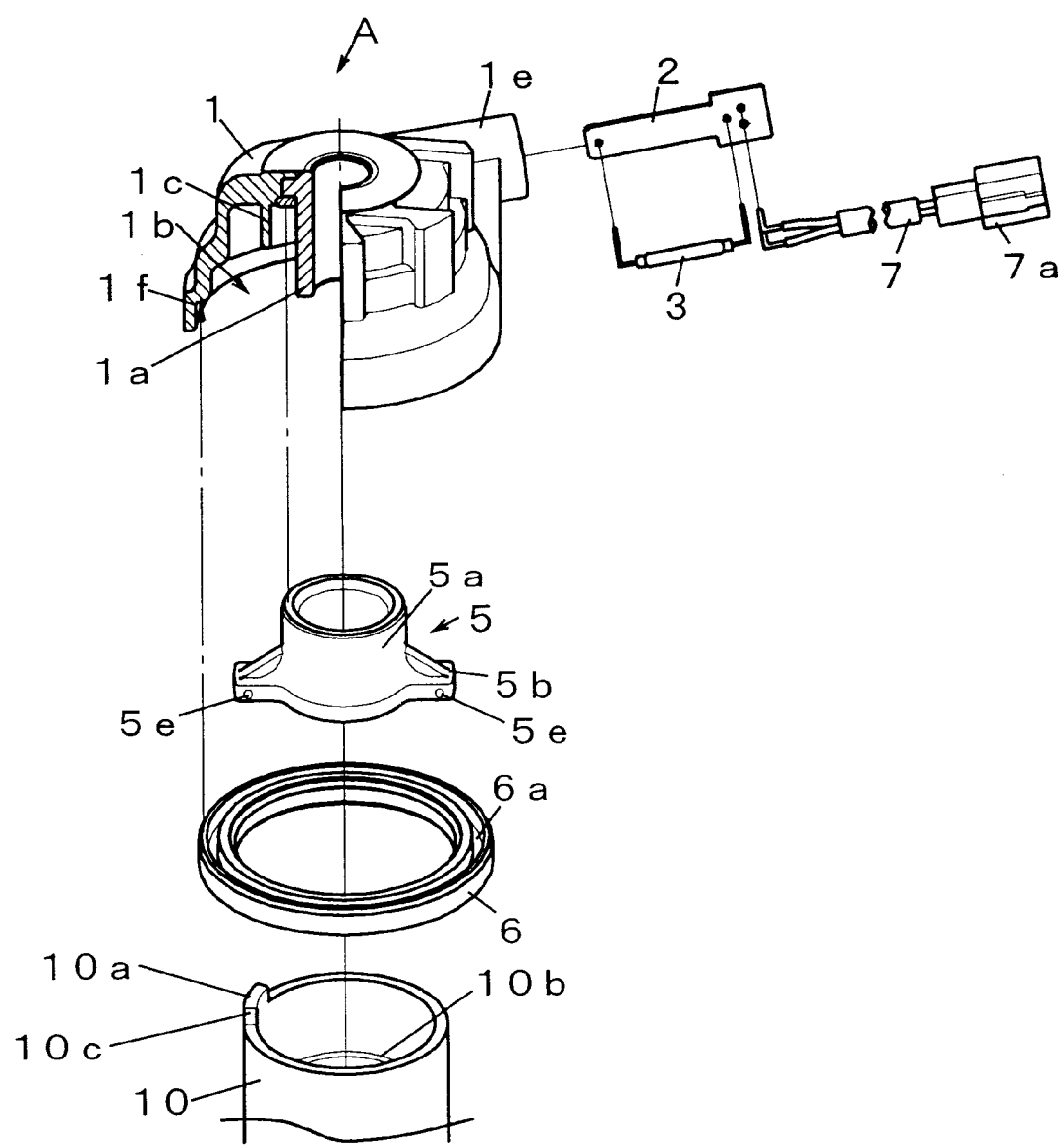
FIG. 9 is an exploded perspective view of a third embodiment.
Figure 10:
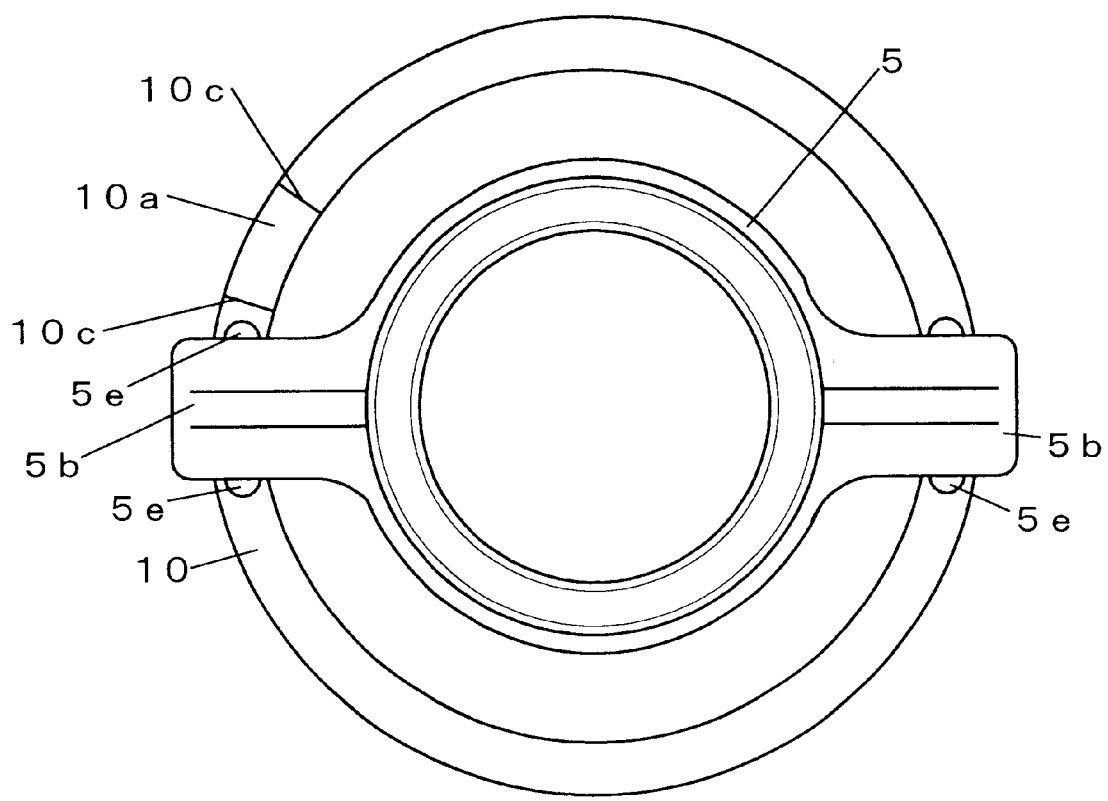
FIG. 10 is a diagram showing relationship between a rotor and a hub in the third embodiment.

Next, a third embodiment will be explained with reference to FIGS. 9 and 10. For the same or corresponding places as the aforementioned respective embodiments, the same reference numerals are given and their detailed explanations will be omitted.

The rotor 5 in the third embodiment is provided with projections 5e that abut against a side face 10c that is an opposing place with the locking claw 10a (one that abuts against the rotation transmitting portion 5b and transmits the rotation of the front wheel 11 to the rotation transmitting portion 5b) that is the rotation-biasing portion of the hub 10 of the rotation transmitting portion 5b. The projections 5e are formed into a semi-sphere that comes into a point contact with the locking claw 10a.

Thus, by disposing the projections 5e at portions where the rotation transmitting portion 5b of the rotor 5 abuts against the locking claw 10a, a contact area between the rotation transmitting portion 5b and the locking claw 10a can be made smaller. Accordingly, even when during a stop state of the vehicle, the vibration exerted by an engine in an idling state, external factors and so on is transmitted (transmitted through the rotation transmitting portion 5b) to the rotor 5, the rotor 5 can be held in close contact with the spacer 4 and even when the rotation transmitting portion 5b in the rotor 5 comes into contact with the locking claw 10a, owing to the projections 5e the contact area between both members can be maintained smaller. Accordingly, since the vibration can be hindered from transmitting, the wrong detection in the magnetic detection can be hindered from occurring.

The lubricant 8 applied to the housing 1, when the rotor 5 rotates, is scattered into a space intimately closed by the housing 1 and the sealing member 6 and comes into a portion where the clocking claw 10a abuts against the rotation transmitting portion 5b. In this case, when a portion where the rotation transmitting portion 5b abuts against the clocking claw 10a is in surface contact, the lubricant 8 sticks together the rotation transmitting portion 5b and the clocking claw 10a. Accordingly, when the clocking claw 10a is separating from the rotation transmitting portion 5b owing to the vibration or the like, it can separate with difficulty. As a result, the rotor 5 is forced to move, resulting in appearing as the detection noise of the rotation detector A.

On the other hand, when the third embodiment is adopted, even when the lubricant 8 comes into the portion where the rotation transmitting portion 5b and the clocking claw 10a abut against each other, since the clocking claw 10a and the rotation transmitting portion 5b abut in a point contact, the lubricant 8 does not stick the rotation transmitting portion 5b and the clocking claw 10a. Accordingly, owing to the vibration or the like, when the clocking claw 10a is separating from the rotation transmitting portion 5b, since it can be easily separated, without moving the rotor 5, the detection noise of the rotation detector A may be hindered from occurring.

In the third embodiment, although the projection 5e is formed into a hemispherical shape, its shape is not restricted to this one. Any shape that can make smaller the contact area where the rotation transmitting portion 5b and the clocking claw 10a abut against each other can be used. For instance, the shape may be one like a wall that allows coming into line contact. Furthermore, its cross section is not restricted to being spherical and may be provided with an angle that two straight lines intersect.

Furthermore, when the clocking claw 10a of the hub 10 is provided with a projection, a place where the rotation transmitting portion 5b comes into contact may be a flat surface.

Still furthermore, by providing the rotor 5 made of plastic magnet with the projections 5e, the projections 5e can be made cheaper, resulting in cost reduction.

Furthermore, the shape of the clocking claw 10a is not restricted to the clocking claw 10a in this third embodiment, but by forming a notch, the rotation transmitting portion 5b may be allowed to locate there.

The wrong detection in the magnetic detection appears conspicuously when the magnetic detecting portion 3 is made of the reed switch and the magnetizing area applied onto the cylindrical portion 5a is located at a switching point in the rotation-detecting surface 1d of the housing 1. However, since the rotor 5 can be hindered from rotating together with the hub 10, even when the cheap magnetic detecting portion that uses the reed switch is used, the rotation detector A that allows detecting the rotation with excellence can be structured.

Furthermore, in the third embodiment, the spacer 4 is insertion molded and disposed to the bottom portion 1g of the housing 1. However, in the invention, the spacer 4 may be disposed and fixed to the bottom portion 1g of the housing 1 by use of an adhesive or the like.

Furthermore, in the third embodiment, since the rotor 5 is pulled toward the bottom portion 1g side of the housing 1, it comes rarely into contact with the inner wheel 12a. However, the invention may be applied to one in which by substituting a corrugated washer for the spacer 4 in the aforementioned embodiment, the rotor 5 is pushed toward the bearing 12. In this case also, since the rotor 5 abuts against the inner wheel 12a through the convexities 5d and can be hindered from vibrating, even when the cheap magnetic detecting portion that uses the reed switch is used, a rotation detector A that allows detecting the rotation with excellence can be structured.

Furthermore, similarly to the aforementioned respective modification modes, without disposing the spacer 4 that is made of the magnetic material, the rotor 5 may be held in close contact with the bottom portion 1g of the housing 1. By constituting like this, the identical operational effect as the modification modes of the aforementioned respective embodiments can be obtained.

Still furthermore, in the aforementioned respective embodiments and modification modes, the rotors 5 in which the cylindrical portion 5a and the rotation transmitting portion 5b are integrated by use of the plastic magnet were explained. However, the rotor in the invention may be separately provided with the cylindrical portion 5a having a plurality of magnetic poles and the rotation transmitting portion 5b that transmits the rotation of the wheel to the cylindrical portion 5a.

In the aforementioned respective embodiments and modifications, as the rotor 5, one in which the cylindrical portion 5a having a plurality of magnetic poles and the rotation transmitting portion 5b that transmits the rotation of the front wheel 10 to the cylindrical portion 5a are integrally provided by use of the plastic magnet is used. However, the invention is effective also in a structure of a rotation detector based on Japanese Patent Application No. 54850/1999 that has been applied by the present applicant, in which an outer periphery (external surface) of a cylindrical portion of a rotor that is inserted in an insertion portion is provided with concavities and convexities (gear structure), the rotation of a front wheel is transmitted through a rotation transmitting portion to the concavities and convexities, and a magnetic detecting portion that is mainly constituted of a magnet and a Hall IC detects the rotating concavities and convexities.

Industrial Applicability

The invention is suitable for a rotation detector that detects the rotation number of a wheel of a two-wheeled vehicle.

What is claimed is:

1. A rotation detector, comprising:
    a housing provided with a tubular insertion portion through which an axle is inserted;
    a rotor provided with a cylindrical portion through which the insertion portion is inserted, the rotor having a plurality of magnetic poles, and configured to rotate synchronously with a wheel equipped to the axle;
    a rotation detecting portion that detects a change of the magnetic poles accompanying rotation of the cylindrical portion; and
    a magnetic member that is disposed in the surroundings of the insertion portion of a bottom portion of the housing and capable of holding the rotor at the bottom portion of the housing when the cylindrical portion is inserted into the insertion portion.

2. A rotation detector as set forth in claim 1, characterized in that the magnetic member is formed of a plane table member that is disposed so as to surround the insertion portion in the bottom portion of the housing.

3. A rotation detector as set forth in claim 1, characterized in that the magnetic member and the insertion portion are integrally molded.

4. A rotation detector, comprising:
    a housing having a first end that abuts against an inner wheel of a bearing disposed to a hub of a wheel and that is provided with a tubular insertion portion through which an axle that penetrates through the bearing is inserted;
    a rotor that is provided with a cylindrical portion through which the insertion portion is inserted and a rotation transmitting portion for rotating the cylindrical portion synchronously with the rotation of the wheel;
    a rotation detecting portion that is disposed to the housing and detects the rotation of the rotor; and
    a convexity that is disposed at a place that faces an inner wheel in the bearing of the rotor and abuttable against the inner wheel.

5. A rotation detector as set forth in claim 4, characterized in that the convexity is partially disposed at a place that faces the inner wheel and along a periphery of an opening through which the insertion portion is inserted.

6. A rotation detector, comprising:
    a housing having a first end that abuts against a bearing disposed to a hub of a wheel and that is provided with a tubular insertion portion through which an axle that penetrates through the bearing is inserted;
    a rotor that is provided with a cylindrical portion through which the insertion portion is inserted and a rotation transmitting portion for transmitting rotation of the wheel to the cylindrical portion by abutting against a rotation biasing portion disposed to the hub;
    a rotation detecting portion that is disposed to the housing and detects the rotation of the rotor; and
    a contact portion that is disposed to a portion that abuts against the rotation-biasing portion of the rotation transmitting portion and maintains a contact area between both members smaller.

7. A rotation detector as set forth in claim 6, characterized in that the contact portion is provided with a projection that comes into contact with a flat surface of the rotation-biasing portion.

8. A rotation detector as set forth in claim 6, characterized in that the contact portion is made of a flat surface that comes into contact with a projection disposed to the rotation-biasing portion.

* * * * *